Sept. 17, 1929.  A. A. MAKINEN  1,728,800
CLOTHESLINE REEL
Filed Aug. 19, 1927
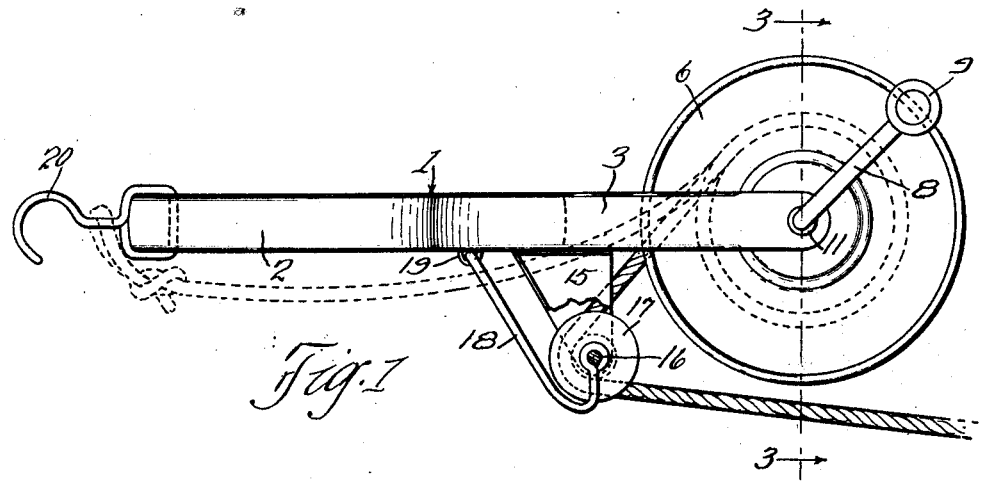
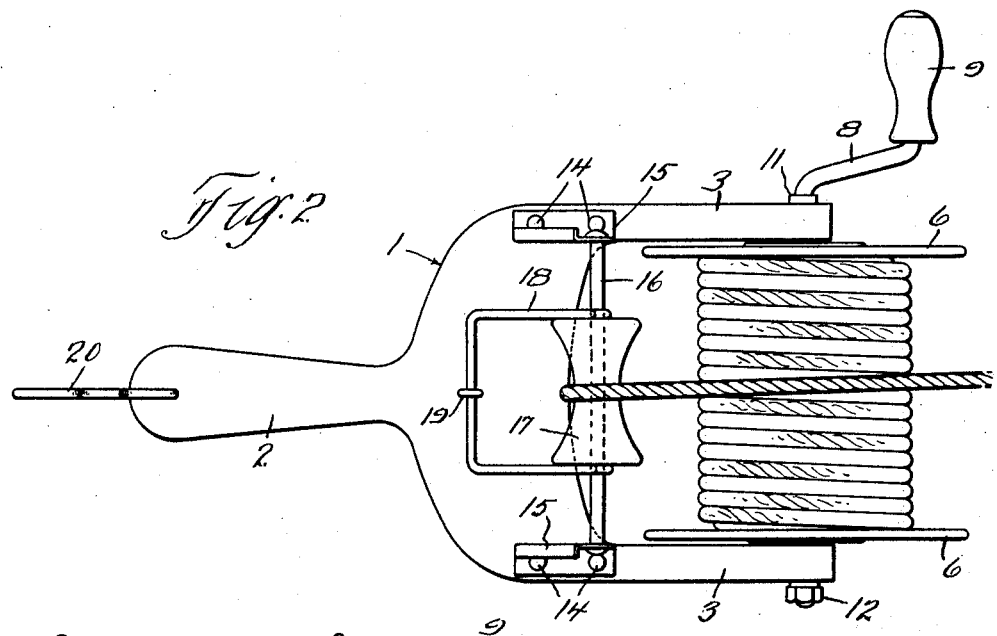
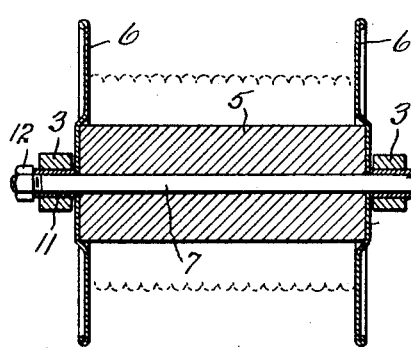
Inventor,
Alto A. Makinen
By Hull, Brock & West
Attorneys Patented Sept. 17, 1929

1,728,800

UNITED STATES PATENT OFFICE

ALTO A. MAKINEN, OF CLEVELAND, OHIO

CLOTHESLINE REEL

Application filed August 19, 1927. Serial No. 214,044.

This invention relates to the class of devices known as clothesline reels, and its objects are to provide a device of this character that is very convenient of use; that is so constructed as to insure against the line becoming entangled with parts of the device while being unwound from the device or while being wound thereon; that is simple of construction and is cheap of manufacture, and that is substantial, and is not likely to get out of order.

The foregoing objects are attained in the embodiment of the invention illustrated in the accompanying drawing wherein Fig. 1 is a side elevation of my improved clothesline reel; Fig. 2 is a bottom plan thereof, and Fig. 3 is a section on the line 3—3 of Fig. 1.

The working parts of the device are mounted upon a frame 1, that is preferably constructed of suitable wood, and is in the shape of a fork, terminating at one end in a handle 2 and at the other in laterally spaced branches 3. Mounted between the branches 3 is the drum or reel on which the clothesline is wound, and the same is comprised of a center core 5, preferably of wood, and circular end plates 6, the core 5 having a central longitudinal bore that is in alignment with apertures in the end plates 6. Extending through said bore and apertures is a shaft 7 that is formed at one end to constitute a crank 8 to which an operating handle or knob 9 is applied as by extending the end portion of the crank through a bore thereof and riveting it beyond the end of said handle or knob. Applied to the shaft 7 beyond each of the plates 6 is a bushing 11, and the end of the shaft opposite the crank 8 is threaded for the application of a nut 12. By screwing this nut up firmly, the bushings 11, plates 6 and core 5 may be tightly clamped between said nut and a shoulder that is formed by the inner end of the crank 8. To prevent these parts from becoming loose, the end of the shaft may be upset beyond the nut 12, as indicated. The bushings 11 rotate freely within bearing apertures in the ends of the branches 3.

Secured by fastening means 14 to the frame 1 adjacent the inner ends of the branches 3 are brackets 15 by and between the lower ends of which is supported a shaft 16, and mounted upon this shaft for both rotary and longitudinal movement is a spool or pulley 17. This pulley is embraced by a yoke 18 that is preferably formed of wire of suitable gauge, and the extremities of its opposed branches are formed with eyes that encircle the shaft 16, while its central branch, that is parallel with the shaft 16, passes freely through a staple 19 that is driven into the body of the frame 1 at about its transverse center.

To the end of the handle 2 is applied a hook 20 that may be used for suspending the device from any convenient object so as to free both hands of the user for the tying of the line to suitable supports; and it also provides a convenient means for hanging up the device when not in use. Furthermore, when the device is idle, the end of the line may be tied in a loop and engaged over the shank of the hook, as indicated in dot-and-dash lines in Fig. 1.

When the device is in use, either in putting up or taking down the clothesline, the line plays over the spool or pulley 17, and said pulley is free to run back and forth on the shaft 16 so as to properly distribute the line upon the drum or reel when the line is being wound thereon, and the shaft 16 is held against yielding in response to any undue strain on the line by means of the yoke 18. It will be noted that the side branches of the yoke 18 are so formed as to guide the line up and over the spool or pulley 17 should the line be carelessly thrown off to one side, and the yoke also prevents the line from being caught between the ends of the spool or pulley and the branches of the yoke. It will further be observed that the rear edges of the brackets 15 are inclined and flanged over so as to avoid the line catching on the brackets if drawn off to one side.

Having thus described my invention, what I claim is:—

1. In a device of the character set forth, the combination of a forked frame having aligned bearing apertures in its opposed branches, a reel situated between said branches and comprising a core and end plates applied to said core, the core having a bore and the end plates having apertures registering with said bore, a shaft extended through said bore and apertures, and a bushing applied to the shaft beyond each of said plates, one end of the shaft being formed to provide an operating handle and having a shoulder for engagement with the adjacent bushing, the opposite end of the shaft having fastening means applied thereto and between which means and the aforesaid shoulder the bushings, plates and core are clamped, the bushings being rotatably supported within the bearing apertures of the aforesaid branches.

2. In a device of the character set forth, the combination of a forked frame having aligned bearing apertures in its opposed branches, a reel situated between said branches and comprising a core and end plates applied to said core, the core having a bore and the end plates having apertures registering with said bore, a shaft extended through said bore and apertures, a bushing applied to the shaft beyond each of said plates, one end of the shaft being formed to provide an operating handle and having an abutment for engagement with the adjacent bushing, the opposite end of the shaft being threaded, and a nut applied to the threaded end of the shaft and between which and the aforesaid abutment the bushings, plates and core are clamped, the bushings being rotatably supported within the bearing apertures of the aforesaid branches.

3. In a device of the character described, the combination of a frame having a handle and a pair of parallel extending branches, a reel disposed between said pair of branches and comprising a core and end plates, a shaft extending through said core and journaled in said pair of branches, means for preventing an endwise movement of said reel, a second shaft carried by said frame and parallel with said first shaft, a pulley rotatably and slidably mounted on said shaft, a yoke embracing said pulley and slidable therewith along the shaft, said yoke being connected with said frame in such manner as to limit the endwise movement of the pulley in either direction.

4. In a device of the character described, the combination of a forked frame having aligned bearing apertures in its opposed branches, a reel disposed between said pair of branches and comprising a core and end plates connected with said core, the core having a bore and the end plates having apertures for registering with said bore, a shaft extending through said bore and apertures and a bushing applied to said shaft beyond each of said end plates and means for preventing endwise movement of the shaft within its bearings.

5. In a device of the character described, the combination of a forked frame having aligned bearing apertures in its opposed branches, a reel disposed between said pair of branches and comprising a core and end plates connected with said core, the core having a bore and the end plates having apertures for registering with said bore, a shaft extending through said bore and apertures and a bushing applied to said shaft beyond each of said end plates and means for preventing endwise movement of the shaft within its bearings, a second shaft carried by said frame, a pulley rotatably and slidably mounted on said shaft, a yoke carried by said pulley and connected with said frame in such a manner as to limit the endwise movement of the pulley in either direction.

In testimony whereof, I hereunto affix my signature.

ALTO A. MAKINEN.